Sept. 6, 1932.   H. C. SANDER   1,876,471
ATTACHMENT FOR FOOD CHOPPERS
Filed Jan. 3, 1930   2 Sheets-Sheet 1
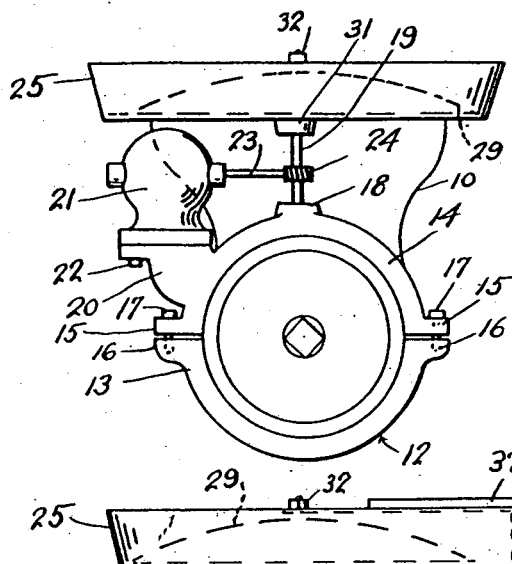
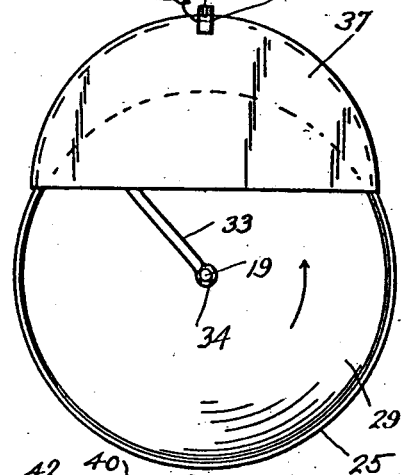
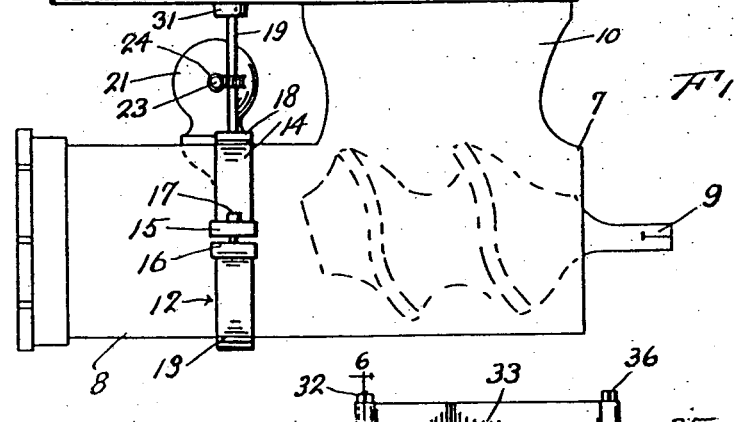
Inventor
Henry C. Sander

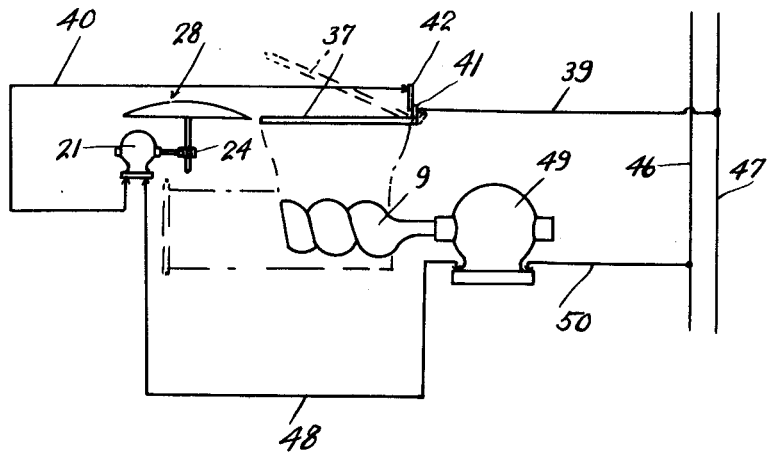
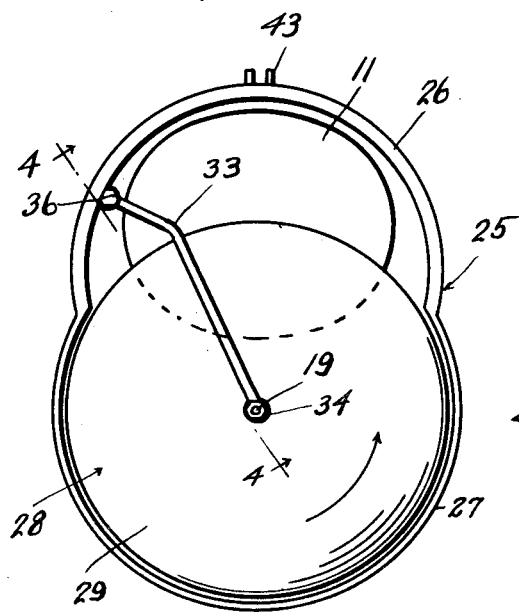
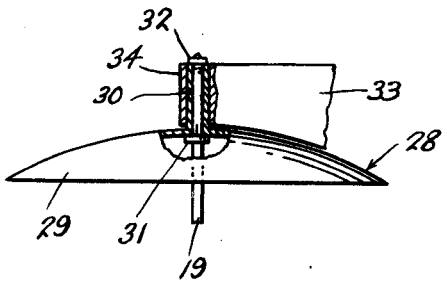

Patented Sept. 6, 1932

1,876,471

UNITED STATES PATENT OFFICE

HENRY C. SANDER, OF ASBURY PARK, NEW JERSEY

ATTACHMENT FOR FOOD CHOPPERS

Application filed January 3, 1930. Serial No. 418,288.

This invention relates to food choppers and particularly to an attachment for food choppers which is very easily installed on the conventional type power food chopper, is strong, compact and durable, thoroughly reliable in its operation, very simple in its method of use and assembly and comparatively inexpensive to manufacture and install.
Another object of the invention is to provide an attachment having a lid to prevent the operator's hands from getting into the mouth of the bowl of the food chopper and as an additional safety factor providing the lid with a circuit closer which will cut out the motor if the lid is opened thereby preventing any harmful injury while the lid is open.

With the foregoing and other objects in view, the invention consists of a novel construction, combination and arrangement of parts as will be hereinafter more specifically described and illustrated in the accompanying drawings, wherein is disclosed an embodiment of the invention, but it is to be understood that changes, variations and modifications may be resorted to without departing from the spirit of the claims hereunto appended.
In the drawings; wherein like reference characters denote corresponding parts through the several views:

Figure 1 is a front elevation of a food chopper illustrating incorporated therein the attachment in accordance with the present invention, Figure 2 is a top plan view thereof, Figure 3 is a side elevation thereof, Figure 4 is a fragmentary elevation taken substantially on the line 4—4 of Figure 5, Figure 5 is a top plan view of the device with the lid removed, Figure 6 is a fragmentary detailed section taken substantially on the line 6—6 of Figure 4.

Figure 7 is a diagrammatic view of the wiring of the device of the invention and the relationship of the main parts thereof.

Referring to the drawings in detail, 7 indicates generally a food chopper including a hollow, cylindrical grinding drum 8 in which rotate the spiral grinding knives 9 and communicating with the inner end of the drum 8 is the upstanding feeding bowl 10 which conducts the meat to be ground into the grinding drum 8.

The mouth of the bowl 10 is indicated at 11. A sectional supporting ring is indicated at 12 and consists of two semi-circular bands 13, 14 each of which is formed with radially projecting flanges 15, 16. Bolts 17 extend through apertures in the adjacent flanges for coupling the ring sections 13 and 14 about the grinding drum 8.

On top of the upper section 14 there is formed a bearing 18 by which the lower end of the drive shaft 19 is journalled to the band. The drive shaft 19 is vertically disposed.

Projecting radially from the upper section 14 is an enlarged boss 20 having a flat upper face that forms a base to which a motor 21 is secured by means of bolts 22. A motor shaft 23 projects inwardly from the motor 21 and has a worm gear on the inner end thereof that meshes with a worm pinion 24 on the drive shaft 19 whereby the drive shaft is rotatably connected with the motor shaft 23.

An open trough 25 is formed of a strap of metal bent to the configuration of the numeral 8 and one of the arcuate sections 26 is disposed on the upper end of the bowl 10 while the other section 27 projects laterally therefrom.

The sides of the strap flare inwardly as will be clearly understood by referring to Figures 1 and 3 of the drawings. A disk indicated generally at 28 is rotatably mounted in the arcuate section 27 and a segmental portion thereof projects into section 26. The disk is convexed at its upper face as indicated at 29.

Centrally of the disk there is formed an upstanding sleeve 30. An annular shoulder 31, on the vertical drive shaft 19 supports the disk. The drive shaft 19 extends through the disk 28 and the sleeve 30. The upper end of the shaft is threaded and provided with a nut 32 which is to be turned so as to engage the upper end of the sleeve 30. This action of the nut 32 also draws the annular shoulder 31 into engagement with the disk adjacent the lower end of the sleeve 30, whereby to clamp the disk for rotation with the shaft 19.

The section 26 communicates with the mouth 11 of the feeding bowl 10 of the food chopper and since a segmental portion of the disk 28 projects into the section 26 and also overhangs the mouth 11, pieces of meat placed upon the rotating disk will be conveyed into the mouth 11 by the scraper blade 33.

The lower edge portion of the scraper blade 33 disposed over the disk is arcuate to form an abutment for conveying pieces of meat from the disk into the mouth 11 of the bowl. The curvature of the lower edge of the scraper blade is closely conformed to and just clears the convex face 29 of the disk so that pieces will not get under the edge of the scraper blade.

A flat segmental shaped lid 37 rests upon the upper edge of section 26 and forms a cover for the section that closes the mouth 11 of the bowl to prevent the hands of the operator getting into the bowl 10 while the machine is in operation. On the arcuate side of the lid 37, the same is hingedly connected as at 38 to section 26.

Leading into the hinge 38 are a pair of conductor wires 39, 40, which are connected with switch contact arms 41, 42. The contact arms 41, 42 are an integral part of the hinge 38 and the hinge is properly insulated so that there will be no short circuiting through the hinge.

When the lid 37 is closed there will be a closed circuit through the motor 21, but as soon as the lid is opened, the circuit is broken thus stopping the motor 21 and halting the operation of the chopper simultaneously thus preventing the possibility of injury to the hands of the operator in the grinding machinery.

The hinge 38 includes a pair of apertured ears 43 on the section 26 that mesh with a pair of apertured ears 44 on the lid 37, and extending through the apertures in the ears is a pin 45 that forms a hinge between the ears. The ears and pin are properly insulated and the switch arm 42 is connected with the ears 43 and switch arm 41 is connected with ears 44 and conductors lead to the respective contact arms 41, 42.

Referring to the wiring diagram in Figure 7 of the drawings 46, 47 denote the supply conduits and connected with one of the supply conduits 47 is the conductor 39 which leads to the switch arm 41 on the lid. From the contact arm 42 the conductor 40 leads to one side of the motor 21 which drives the disk 28 and from the other side of the motor a conductor 48 leads to one side of the motor 49 which drives the grinding member 9.

From the other side of the motor 29 there is a conductor 50 which is connected with the other side 46 of the supply line, thus completing a closed circuit. When the lid 37 is raised to the position of the dotted line in Figure 7, the circuit is broken through both motors 21 and 49 whereby the operator is protected from getting his hands caught in the grinding member 9 while the cover is removed.

It is to be understood that by describing in detail herein any particular form, structure, arrangement, it is not intended to limit the invention beyond the terms of the several claims or the requirements of the prior art.

Having thus described my invention, what I claim as new is:

1. An attachment of the class described for a conventional food chopper, comprising in combination, a food chopper, a split ring mounted on the horizontal cylinder of the chopper, a radial projection on the ring, a motor supported on the projection, a bearing on the ring, a vertical shaft rotatably supported in said bearing, a connection between the motor and the shaft for rotating the same, a shallow trough of circular formation and having a semi-circular extension at one side, said trough adapted to be mounted on the feeding bowl of the chopper and project outwardly therefrom to receive journalled through its center portion the upper end of the shaft, said semi-circular extension being disposed immediately upon said bowl and apertured to empty thereinto, a convex rotatable disk in said trough on the upper end of the shaft therein, a stationary scraper blade projected radially from the center of said disk and secured upon the upper end of the shaft and the wall of the extension of the trough for directing the material deposited on said disk into the bowl.

2. An attachment of the class described for a conventional food chopper, comprising in combination, a food chopper, a stationary motor support secured to the horizontal cylinder of the chopper, a bearing on the cylinder, a vertical shaft rotatably supported in said bearing, a connection between the motor and the shaft for rotating the same, a shallow trough of circular formation and having a semi-circular extension at one side, said trough adapted to be mounted on the feeding bowl of the chopper and extend outwardly therefrom to receive journalled through its center portion the upper end of the shaft, said semi-circular extension being disposed immediately upon said bowl and apertured to empty thereinto, a convex rotatable disk in said trough on the upper end of the shaft therein, a stationary scraper blade projected radially from the center of said disk and supported upon the upper end of the shaft and attached to the wall of the extension of the trough for directing the material deposited on said disk into the bowl, a cover hinged on said extension for covering the same, a switch incorporated in said hinge for breaking the circuit through the motor and stopping the operation of the chopper and disk when the cover is raised.

3. An attachment for a conventional food chopper comprising, a motor support clampable upon the body of the chopper, a motor rigidly supported by the motor support, a vertical shaft rotatably carried by the motor support with which said motor is operatively connected, a trough mounted upon the feeding bowl of the chopper and in communication therewith, an eccentric portion on said trough, rotary means in said eccentric portion for feeding material into said feeding bowl, guide means in said eccentric portion for cooperating with the rotary means to direct the material into said feeding bowl, said rotary means and said vertical shaft being connected for rotation, swingable cover means for said eccentric portion, and means operable by swinging the cover from covering position for stopping said motor.

4. An attachment for a conventional food chopper driven by an electric motor, comprising, a motor support clampable upon the body of the chopper, a motor rigidly supported by the motor support, a vertical shaft rotatably carried by the motor support with which said motor is operatively connected, a trough mounted upon the feeding bowl of the chopper and in communication therewith, an eccentric portion on said trough, rotary means in said eccentric portion for feeding material into said feeding bowl, guide means in said eccentric portion for cooperating with the rotary means to direct the material into said feeding bowl, said rotary means and said vertical shaft being connected for rotation, swingable cover means for said eccentric portion, and means operable by swinging the cover from covering position for stopping said motor, and the food chopper motor.

In testimony whereof I affix my signature.

HENRY C. SANDER.